US009952596B2

(12) United States Patent
Foster et al.

(10) Patent No.: US 9,952,596 B2
(45) Date of Patent: Apr. 24, 2018

(54) SYSTEM AND METHOD FOR AUTONOMOUS VEHICLE COMMUNICATIONS PROTOCOLS

(71) Applicants: CNH Industrial America LLC, New Holland, PA (US); Autonomous Solutions, Inc., Mendon, UT (US)

(72) Inventors: Christopher Alan Foster, Mohnton, PA (US); Bret Todd Turpin, Wellsville, UT (US); Daniel John Morwood, Petersboro, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/179,762

(22) Filed: Jun. 10, 2016

(65) Prior Publication Data

US 2017/0357259 A1    Dec. 14, 2017

(51) Int. Cl.
*A01B 69/00* (2006.01)
*G05D 1/02* (2006.01)
(Continued)

(52) U.S. Cl.
CPC ............. *G05D 1/021* (2013.01); *A01B 69/00* (2013.01); *G05D 1/0011* (2013.01); *H04L 12/40* (2013.01);
(Continued)

(58) Field of Classification Search
CPC ...... A01B 69/00; A01B 69/008; G05D 1/021; G05D 1/0011; H04L 43/0858
See application file for complete search history.

(56) References Cited

U.S. PATENT DOCUMENTS 6,604,038 B1 *   8/2003   Lesesky ................ G07C 5/008
                                                340/988
8,634,960 B2 *   1/2014   Sandin ................. G05D 1/028
                                                56/10.2 E
(Continued)

FOREIGN PATENT DOCUMENTS

WO      2009091536      7/2009

OTHER PUBLICATIONS

PCT Notification of Transmittal of the International Search Report and The Written Opinion of The International Searching Authority, or the Declaration; dated Aug. 17, 2017.

*Primary Examiner* — Todd Melton
(74) *Attorney, Agent, or Firm* — Rebecca L. Henkel; Rickard K. DeMille

(57) ABSTRACT

In an embodiment, an autonomous vehicle system includes an autonomous vehicle. The autonomous vehicle includes a communications system configured to communicate with the base station, and a control system communicatively coupled to the communications system, the control system comprising a processor. The processor is configured to receive driving commands from the base station, execute the driving commands to drive the autonomous vehicle, and execute a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle.

17 Claims, 3 Drawing Sheets

(51) Int. Cl.
  *G05D 1/00* (2006.01)
  *H04L 29/08* (2006.01)
  *H04L 12/26* (2006.01)
  *H04L 12/40* (2006.01)
  *H04L 29/06* (2006.01)
  *H04W 4/02* (2018.01)
  *A01C 7/08* (2006.01)

(52) U.S. Cl.
  CPC .......... *H04L 43/0858* (2013.01); *H04L 67/12* (2013.01); *H04L 69/26* (2013.01); *H04W 4/023* (2013.01); *A01C 7/081* (2013.01); *H04L 2012/40215* (2013.01)

(56) References Cited

U.S. PATENT DOCUMENTS

| | | | |
|---|---|---|---|
| 8,676,466 B2* | 3/2014 | Mudalige | G08G 1/163 |
| | | | 370/252 |
| 8,947,522 B1 | 2/2015 | Hickman et al. | |
| 9,156,476 B2* | 10/2015 | O'Neill | B25J 13/006 |
| 9,220,086 B2* | 12/2015 | Wang | H04B 7/18506 |
| 9,368,026 B1* | 6/2016 | Herbach | G08G 1/00 |
| 2009/0281676 A1 | 11/2009 | Beavis et al. | |
| 2016/0021193 A1* | 1/2016 | Fischer | H04L 67/2823 |
| | | | 709/224 |

* cited by examiner

SYSTEM AND METHOD FOR AUTONOMOUS VEHICLE COMMUNICATIONS PROTOCOLS

BACKGROUND

The invention relates generally to autonomous vehicles, and more specifically to autonomous vehicle communications protocols.

Certain autonomous vehicles may operate via control systems that direct the steering of autonomous vehicles without much, if any, human intervention. For example, certain unmanned agricultural tractors may be autonomously steered in fields having a variety of soil conditions and obstacles. Generally, the autonomous vehicle, such as the unmanned agricultural tractor, may be provided a map that may be used by the autonomous vehicle to follow certain paths and to avoid certain terrain features. Accordingly, a control system, such as an electronic control system, may be used to control and/or otherwise steer the autonomous vehicle. The unmanned agricultural tractor may thus be steered through a field having soft soil (e.g., due to a high moisture content of the soil), around ponds, in proximity to human structures and boundaries (e.g., fences, barns), and so on. It would be beneficial to improve on autonomous vehicle communications protocols.

BRIEF DESCRIPTION

In one embodiment, an autonomous vehicle system includes an autonomous vehicle. The autonomous vehicle includes a communications system configured to communicate with the base station, and a control system communicatively coupled to the communications system, the control system comprising a processor. The processor is configured to receive driving commands from the base station, execute the driving commands to drive the autonomous vehicle, and execute a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle.

In another embodiment, a method includes communicating driving commands from a base station, and executing the driving commands to drive an autonomous vehicle. The method additionally includes executing a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle.

In a further embodiment, a non-transitory, computer readable medium comprises instructions that when executed by a processor cause the processor to communicate driving commands from a base station and execute the driving commands to drive an autonomous vehicle. The instructions when executed by the processor additionally cause the processor to execute a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Certain agricultural and other operations (mining, construction, and the like) may use an unmanned and/or manned vehicle such as a tractor or other vehicle. For agricultural operations, the vehicle may tow or include an agricultural implement such as a planter, seeder, fertilizer, and so on. In operations, the vehicle may be communicatively coupled to a base station, for example, via a radio link. The base station may include a command and control system suitable for issuing certain commands to the autonomous vehicle, and the autonomous vehicle may respond to the commands by autonomously actuating certain system (e.g., steering system, throttle system, transmission system) to drive around an operations area.

The techniques described herein provide for certain communication protocols that include maintaining a valid radio link between the autonomous vehicle and the base station, engaging an e-stop (e.g., emergency stop), maintaining a geographic fence of operations, maintaining valid communications between a autonomous vehicle controller and certain autonomous vehicle subsystems, and providing for protocols suitable for a human operator to exit and/or enter the autonomous vehicle, as described in further detail below.

Figure 1:
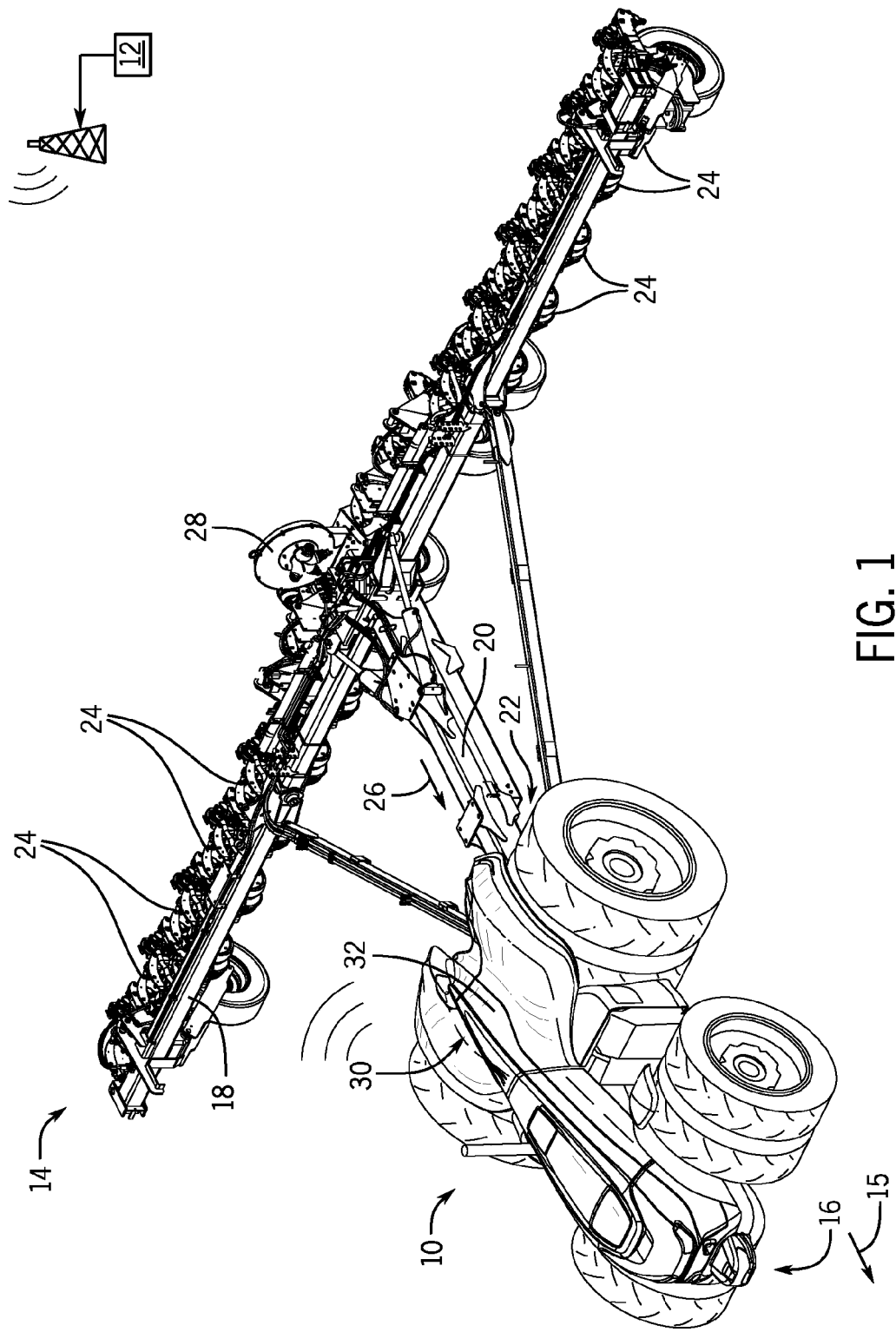
FIG. 1 is a schematic diagram of an embodiment of an autonomous vehicle operating within an agricultural field and communicatively coupled to a base station via a communication protocol.

Turning now to FIG. 1, a perspective view of an embodiment of an autonomous agricultural vehicle 10 capable of autonomous or manual operation that may be communicatively coupled to a base station 12. The autonomous agricultural vehicle 10 is shown towing an attached implement 14 is depicted, in accordance with an embodiment. The autonomous agricultural vehicle 10 includes a controller configured to automatically guide the autonomous agricultural vehicle 10 through a field (e.g., along a direction of travel 15) to facilitate agricultural operations. Example agricultural operations that the autonomous agricultural vehicle 10 and the implement 14 may perform include planting operations, seeding operations, application operations, tillage operations, harvesting operations, and the like. For example, the controller may automatically guide the agricultural vehicle 10 that pulls the implement 14 along a guidance swath through the field without input from an operator. The controller may also automatically guide the agricultural vehicle 10 around headland turns between segments of the guidance swath. To facilitate control of the autonomous agricultural vehicle, the controller includes a spatial locating device, such as a Global Position System (GPS) receiver, which is configured to output position information to the controller.

The autonomous agricultural vehicle 10 may be controlled remotely by a human operator in the base station 12. As such, the autonomous agricultural vehicle 10 may be communicatively coupled to the base station 12 through wireless techniques. In some embodiments, operating autonomously may refer to the ability of the autonomous agricultural vehicle 10 to sense its environment and operate without input from the operator, as noted above. Thus, the autonomous agricultural vehicle 10 may include one or more sensors 16 that obtain data (e.g., object proximity, position of the vehicle 10, speed of the vehicle 10, weather, etc.) and provide the data to the controller of the autonomous agricultural vehicle 10. The controller may process the data to determine how to autonomously operate the autonomous agricultural vehicle 10 as desired.

Further, the controller may store an agricultural particulate prescription map (e.g., seeding rate, location of seeding to be disbursed, etc.) to execute to control the implement 14. As depicted, the implement 14 includes a hollow support frame 18, a tow frame 20, a hitch assembly 22, and row units 24. More specifically, one end of the tow frame 20 is connected to the hollow support frame 18 and the other end is connected to the hitch assembly 22, which enables a coupling to the autonomous agricultural vehicle 10. Thus, the implement 14 may be towed along a direction of travel 26 by the autonomous agricultural vehicle 10.

Additionally, as depicted, a plurality of row units 24 is coupled to the hollow support frame 18. Thus, as the autonomous agricultural vehicle 10 tows the implement 14, each of the row units 24 may deposit seeds at a desired depth beneath the soil surface, thereby establishing rows of planted seeds. It should be noted that the number of row units 24 may be adjusted based on a desired number of seed rows. In other words, the implement 14 may be adjusted to include 6, 8, 12, 16, 24, 32, or 36 row units, or more.

Furthermore, the spacing between row units 24 may be selected based on the type of seed being planting. For example, the row units 24 may be spaced 30 inches from one another when planting corn, and 15 inches from one another when planting soy beans. As such, the number and/or spacing of the row units 24 may be adjusted multiple times during the lifespan of the implement 14.

As described above, the row units 24 may control the planting of seeds. More specifically, each row unit 24 may utilize vacuum pressure to control the seed flow rate and/or the spacing between planted seeds. Accordingly, in the depicted embodiment, a vacuum source 28 is mounted on the support frame 18. In the depicted embodiment, the implement 14 utilizes a single centralized vacuum source. Additionally or alternatively, multiple vacuum sources may be used. For example, a first vacuum source may supply vacuum pressure to half of the row units 24, and a second vacuum source may supply vacuum pressure to the other half of the row units 24.

In some embodiments, the vacuum source 28 may be a fan that displaces air to generate vacuum pressure. For example, the vacuum source 28 may expel air from the row units 24 to generate a negative vacuum pressure. Thus, any suitable vacuum source 28 may be utilized, such as a hydraulically driven fan, an electrically drive fan, and so forth. Moreover, embodiments of the fan may include an axial fan, a blower-type fan, a plurality of parallel fans, a plurality of sequential fans, a turbine-type fan, or any combination thereof. To facilitate distributing the vacuum pressure, a conduit or tubing system may be used to pneumatically couple the vacuum source 28 to the hollow frame structure 18. An operator station 30 may include a cover 32 that conceals a compartment of the operator station 30 that includes a foldable chair for an operator to sit in, a steering wheel or steering assembly, and/or an ignition switch, among other things.

The controller and/or the base station 12 may also execute a variety of communications protocols. For example, a base station-to-vehicle latency protocol may maintain a valid radio link between the autonomous vehicle 10 and the base station 12. A geographic communications protocol may maintain a geographic fence of operations. A vehicle controller-to-subsystems latency protocol may maintain a valid communications link between the controller and certain autonomous vehicle subsystems. Additionally, an operator exit protocol may enable a human operator to exit the autonomous vehicle 10 and then stop the autonomous vehicle 10 from restarting until the operator is at a desired distance (e.g., back in the base station 12).

Figure 2:
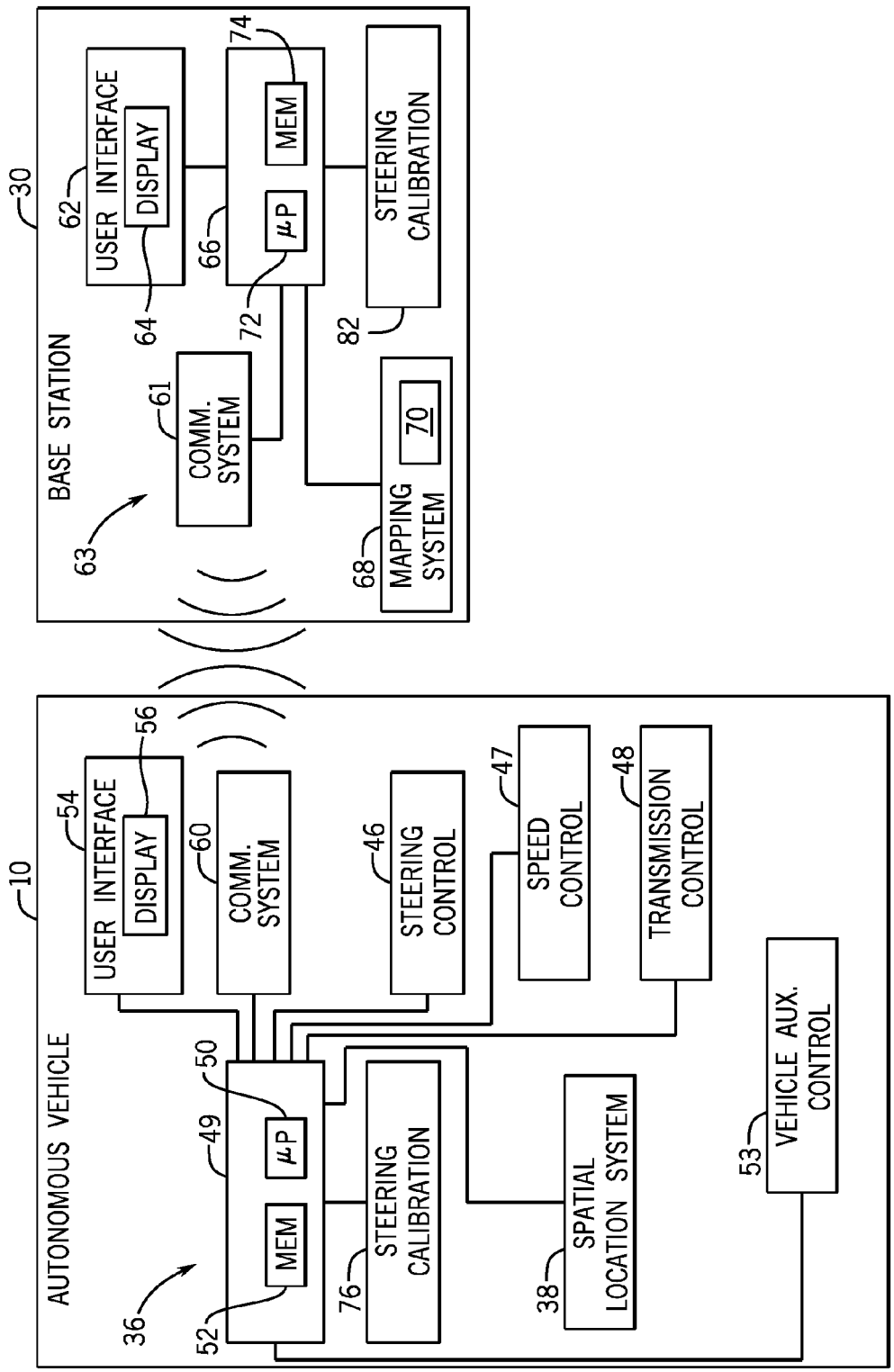
FIG. 2 is a block diagram of an embodiment of computing systems for the agricultural vehicle of FIG. 1, and for the base station.

Turning now to FIG. 2, the figure is a schematic diagram of an embodiment of a control system 36 that may be employed within the autonomous vehicle 10 of FIG. 1. In the illustrated embodiment, the control system 36 includes a spatial location system 38, which is mounted to the autonomous agricultural vehicle 10 and configured to determine a position, and in certain embodiments a velocity, of the autonomous agricultural vehicle 10. As will be appreciated, the spatial location system 38 may include any suitable system configured to measure and/or determine the position of the autonomous agricultural vehicle 10, such as a global positioning system (GPS) receiver, for example, and/or GLONASS or other similar system. The spatial location system 38 may additionally use real time kinematic (RTK) techniques to enhance positioning accuracy.

In certain embodiments, the controller may also include an inertial measurement unit (IMU) communicatively coupled to the controller and configured to enhance the accuracy of the determined position and/or orientation. For example, the IMU may include one or more accelerometers configured to output signal(s) indicative of acceleration along a longitudinal axis, a lateral axis, a vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the agricultural vehicle based on the IMU signal(s) while spatial locating signals received by the spatial locating device are insufficient to facilitate position determination (e.g., while an obstruction, such as a tree or building, blocks the spatial locating signals from reaching the spatial locating antennas). In addition, the controller may utilize the IMU signal(s) to enhance the accuracy of the determined position and/or orientation. For example, the controller may combine the IMU signal(s) with the spatial locating data and/or the position determined by the spatial locating device (e.g., via Kalman filtering, least squares fitting, etc.) to determine a more accurate position and/or orientation of the agricultural vehicle (e.g., by compensating for movement of the spatial locating device resulting from pitch and/or roll of the autonomous agricultural vehicle 10 as the vehicle 10 traverses uneven terrain).

In certain embodiments, the IMU and the spatial locating device may be disposed within a common housing. In further embodiments, the IMU and one spatial locating antenna may be disposed within a common housing. For example, each spatial locating antenna housing may include a spatial locating antenna and an IMU. Furthermore, in certain embodiments, a portion of the spatial locating device and one spatial locating antenna may be disposed within a common housing. For example, a first portion of the spatial locating device and the first spatial locating antenna may be disposed within a first housing, and a second portion of the spatial locating device and the second spatial locating antenna may be disposed within a second housing. In certain embodiments, a first IMU may be disposed within the first housing, and a second IMU may be disposed within the second housing.

In the illustrated embodiment, the control system 36 includes a steering control system 46 configured to control a direction of movement of the autonomous agricultural vehicle 10, and a speed control system 47 configured to control a speed of the autonomous agricultural vehicle 10, for example, via throttle control. The control system 36 further includes a transmission control system 48 that may be used to adjust the input-output ratio of the transmission on the autonomous vehicle system 10. In addition, the control system 36 includes a controller 49, which is communicatively coupled to the spatial locating device 38, to the steering control system 46, and to the speed control system 47. The controller 49 is configured to automatically control the agricultural vehicle during certain phases of agricultural operations (e.g., without operator input, with limited operator input, etc.).

In certain embodiments, the controller 49 is an electronic controller having electrical circuitry configured to process data from the spatial locating device 38 and/or other components of the control system 36. In the illustrated embodiment, the controller 49 includes a processor, such as the illustrated microprocessor 50, and a memory device 52. The controller 49 may also include one or more storage devices and/or other suitable components. The processor 50 may be used to execute software, such as software for controlling the autonomous agricultural vehicle, software for determining vehicle orientation, software to perform communications protocol execution, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous agricultural vehicle, instructions for determining vehicle orientation, instructions for executing the communications protocols, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous agricultural vehicle, etc.), and any other suitable data.

In certain embodiments, the steering control system 46 may include a wheel angle control system, a differential braking system, a torque vectoring system, or a combination thereof. The wheel angle control system may automatically rotate one or more wheels and/or tracks of the autonomous agricultural vehicle (e.g., via hydraulic actuators) to steer the autonomous agricultural vehicle along a desired route (e.g., along the guidance swath, along the swath acquisition path, etc.). By way of example, the wheel angle control system may rotate front wheels/tracks, rear wheels/tracks, and/or intermediate wheels/tracks of the autonomous agricultural vehicle, either individually or in groups. A differential braking system may independently vary the braking force on each lateral side of the autonomous agricultural vehicle to direct the autonomous agricultural vehicle along a path. Similarly, a torque vectoring system may differentially apply torque from an engine to wheels and/or tracks on each lateral side of the autonomous agricultural vehicle, thereby directing the autonomous agricultural vehicle along a path. In further embodiments, the steering control system may include other and/or additional systems to facilitate directing the autonomous agricultural vehicle along a path through the field.

In certain embodiments, the speed control system 47 may include an engine output control system, a braking control system, or a combination thereof. The engine output control system may vary the output of the engine to control the speed of the autonomous agricultural vehicle. For example, the engine output control system may vary a throttle setting of the engine, a fuel/air mixture of the engine, a timing of the engine, other suitable engine parameters to control engine output, or a combination thereof. In addition, the transmission control system 48 may adjust the input-output ratio of the transmission to control the speed of the autonomous agricultural vehicle. Furthermore, the braking control system may adjust braking force, thereby controlling the speed of the autonomous agricultural vehicle. In further embodiments, the speed control system may include other and/or additional systems to facilitate adjusting the speed of the autonomous agricultural vehicle.

In certain embodiments, the control system 36 may also control operation of the agricultural implement 14 coupled to the autonomous agricultural vehicle 10. For example, the control system 36 may include an implement control system/implement controller configured to control a steering angle of the implement 14 (e.g., via an implement steering control system having a wheel angle control system and/or a differential braking system) and/or a speed of the autonomous agricultural vehicle/implement system (e.g., via an implement speed control system having a braking control system). In some embodiments, the controller 49 may be communicatively coupled various systems, such as systems 46, 47, 48, a communication network, such as a controller area network (CAN bus). A vehicle auxiliary control system 53 is also shown, suitable for control of certain auxiliary systems, such as electro-hydraulic remotes (EHR's), Power take off (PTO), Hitch systems, and the like.

In the illustrated embodiment, the control system 36 includes a user interface 54 communicatively coupled to the controller 49. The user interface 54 is configured to enable an operator (e.g., standing proximate to the autonomous agricultural vehicle) to control certain parameter associated with operation of the autonomous agricultural vehicle. For example, the user interface 54 may include a switch that enables the operator to configure the autonomous agricultural vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a guidance swath, a visual representation of certain parameter(s) associated with operation of the autonomous agricultural vehicle (e.g., fuel level, oil pressure, water temperature, etc.), a visual representation of certain parameter(s) associated with operation of an implement coupled to the autonomous agricultural vehicle (e.g., seed level, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous agricultural vehicle and/or the implement.

In the illustrated embodiment, the control system 36 includes a communications system 60 communicatively coupled to the controller 49. In certain embodiments, the communications system 60 is configured to establish a communication link with a corresponding communications system 61 of the base station 12, thereby facilitating communication between the base station 12 and the control system 36 of the autonomous agricultural vehicle. For example, the base station 12 may include a control system 63 having a user interface 62 having a display 64 that enables a remote operator to provide instructions to a controller 66 (e.g., instructions to initiate automatic control of the autonomous agricultural vehicle 10, instructions to direct the autonomous agricultural vehicle along a path, instructions to transmit mapping data, etc.).

In certain embodiments, the controller 66 of the control system 63 is an electronic controller having electrical circuitry configured to process data from a mapping system 68 having a map 70. In the illustrated embodiment, the controller 66 includes a processor, such as the illustrated microprocessor 72, and a memory device 74. The controller 66 may also include one or more storage devices and/or other suitable components. The processor 72 may be used to execute software, such as software for controlling the autonomous agricultural vehicle, software for determining vehicle orientation, software to perform communications protocols, and so forth. Moreover, the processor 72 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the autonomous agricultural vehicle, instructions for determining vehicle orientation, for executing communications protocols, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous agricultural vehicle, mapping software or firmware, etc.), and any other suitable data.

The communication systems 60, 61 may operate at any suitable frequency range within the electromagnetic spectrum. For example, in certain embodiments, the communication systems 60, 61 may broadcast and receive radio waves within a frequency range of about 1 GHz to about 10 GHz. In addition, the communication systems 60, 61 may utilize any suitable communication protocol, such as a standard protocol (e.g., Wi-Fi, Bluetooth, etc.) or a proprietary protocol.

A communications protocol system 76 is provided in the control system 36, and communications protocol system 78 is provided in the control system 66, both suitable for executing one or more communications protocols. As mentioned earlier, a base station-to-vehicle latency protocol may maintain a valid radio link between the autonomous vehicle 10 and the base station 12. A geographic communications protocol may maintain a geographic fence of operations. A vehicle controller-to-subsystems latency protocol may maintain a valid communications between the controller and certain autonomous vehicle subsystems. Additionally, an operator exit protocol may enable a human operator to exit the autonomous vehicle 10 and then stop the autonomous vehicle 10 from restarting until the operator is at a desired distance (e.g., back in the base station 12).

In certain embodiments, each of the protocols (e.g., a base station-to-vehicle latency protocol, geographic communications protocol, vehicle controller-to-subsystems latency protocol, operator exit protocol) may be executed in the control system 36, in the control system 63, or in both. Additionally, the communications protocol systems 76, 78 may include dedicated hardware, such as other processors 50, 72, and memories 52, 74, dedicated to executing the base station-to-vehicle latency protocol, the geographic communications protocol, the vehicle controller-to-subsystems the latency protocol, and/or the operator exit protocol.

Figure 3:
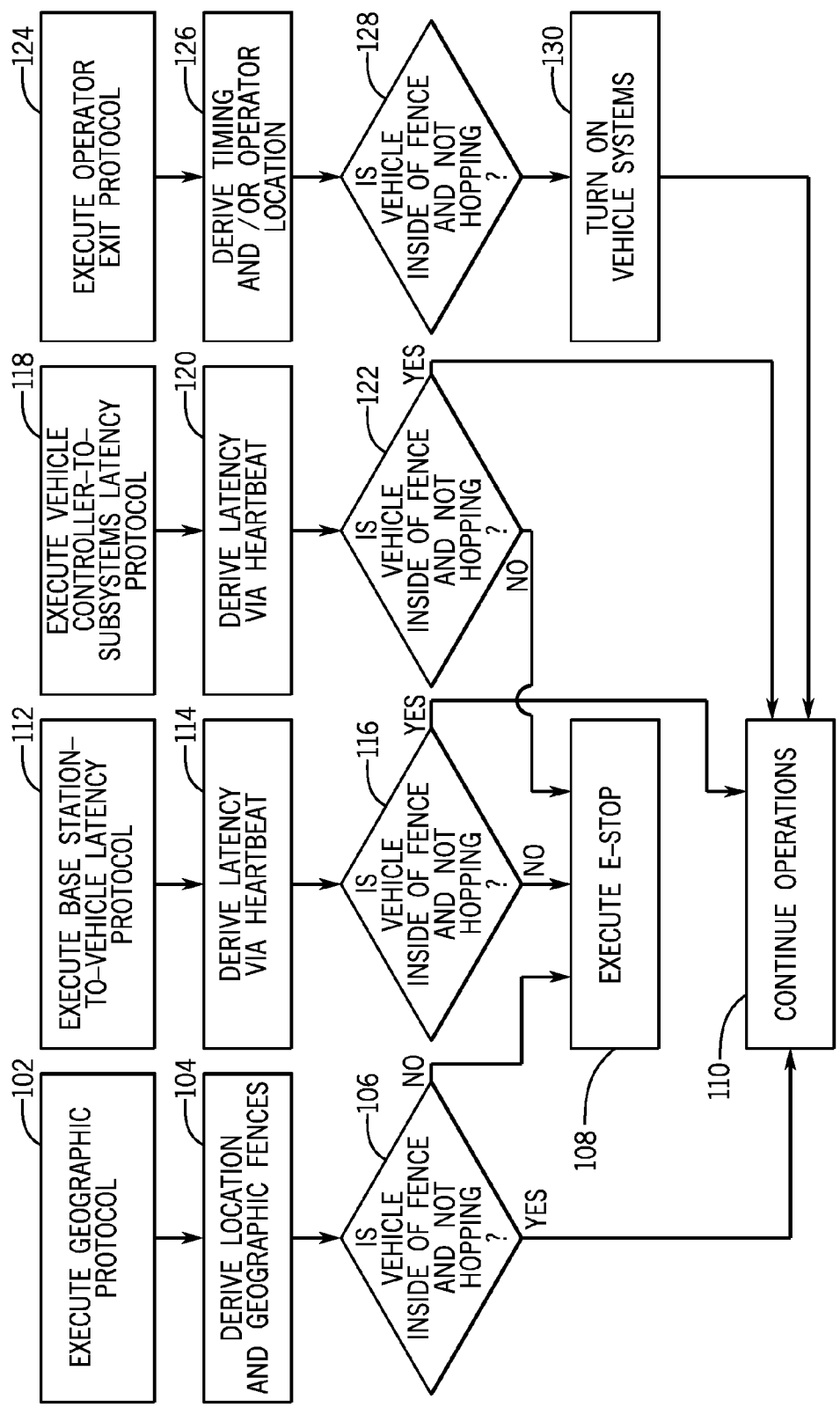
FIG. 3 is a flowchart of an embodiment of a process suitable for executing communication protocols for the autonomous vehicle of FIG. 1.

FIG. 3 illustrates a flowchart of an embodiment of a process 100 suitable for executing the base station-to-vehicle latency protocol, geographic communications protocol, vehicle controller-to-subsystems latency protocol, and operator exit protocol. The process 100 may be implemented as computer instructions or code stored in the memories 52, 74 and executable via the processors 50, 72. In the depicted example, the process 100 may execute (block 102) the geographic communications protocol by first deriving (block 104) a location of the autonomous vehicle 10 and/or one or more geographic fences. The geographic fences, for example, may fence an agricultural field, or portions of the field in the map 70. By using the derived location, the process 100 may determine (decision 106) if the autonomous vehicle 10 is inside desired locations marked of fenced in the map 70. If the autonomous vehicle 10 were to exit a fence deemed a containment fence, or enter a fence that is declared off limits, then the process 100 may put the autonomous vehicle 10 in an idle state and/or execute an e-stop (block 108). Likewise, if it is determined that the location is "hopping", which may be defined as the derived location moving around faster than expected, for example, because of atmospheric conditions, satellite anomalies, and the like, related to the spatial location system 38, the process 100 may put the autonomous vehicle 10 in the idle state and/or execute the e-stop (block 108).

The e-stop (block 108) may slow the autonomous vehicle and then stop the autonomous vehicle. However, if decision 106 determines that the autonomous vehicle 10 is inside desired geographic fences and not hopping, then the process 100 may continue (block 110) normal operations. The process 100 may also execute (block 112) the base station to-vehicle latency protocol. For example, the process 100 may first derive (block 114) a communications latency between the autonomous vehicle 10 and the base station 12. In the depicted embodiment, the latency may be derived (block 114) by using heartbeat or keep-alive techniques. For example, the communications system 60 may ping the communications system 61, or vice versa, and the pings timed. If the pings have no response after a desired time (e.g., 3-5 seconds) has elapsed or are deemed too slow, then decision 116 may determine that communications latency is not acceptable. If latency is not acceptable (decision 116), then the autonomous vehicle 10 may be put in the idle state and/or commanded to execute the e-stop (block 108), as described earlier. If the latency is acceptable (decision 116), the autonomous vehicle 10 may continue (block 110) normal operations.

The process 100 may also execute (block 118) the vehicle controller-to-subsystems latency protocol. For example, the process 100 may first derive (block 120) a communications latency between the controller 49 and various subsystems, such as the steering control system 46, the speed control system 47, the transmission control system 48, and so on, included in the control system 36. To derive (block 120) the latency between the controller 49 and other systems included the control system 36, the controller 36 may execute a heartbeat process deriving a time of receipt of messages between the vehicle controller 49 and the vehicle systems 46, 47, 48, and the like. In one embodiment, a counter may be incremented, and at a desired count, a number of messages communicated between the controller 49 and the systems 46, 47, 48 may be compared to a desired number. If the number of communicated messages is less than the desired number then the communications latency between the controller 49 and various systems may be too high. In other embodiments, an internal clock may be used to track time between send/acknowledge messages, for example, and the tracked time compared to a desired time to derive the latency.

If the communications latency between the controller 49 and various subsystems is deemed not acceptable (decision 122), then the autonomous vehicle 10 may be put in the idle state and/or asked to execute the e-stop (block 108). The process 100 may additionally execute (block 124) the operator exit protocol. To execute (block 124) the operator exit protocol, the process 100 may sense or be told that the operator is now exiting the autonomous vehicle 10. For example, the operator may input that the operator is now exiting via the user interface 54. Additionally or alternatively, a proximity sensor may be used to derive that the operator has exited the autonomous vehicle 10, or a keyfob or similar device may be used to determine that the keyfob is no longer in the autonomous vehicle 10. The operator may also wear an RFID tag, carry a cell phone transmitting certain frequencies, or carry other signaling device useful to denote proximity of the operator to the autonomous vehicle 10. Additionally or alternatively, the process 100 may initiate a countdown timer (e.g., 10 second counter) may be when the operator exits the autonomous vehicle 10. Once the location of the operator is deemed acceptable and/or the countdown timer reaches zero, the autonomous vehicle 10 may start up certain systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An autonomous vehicle system, comprising:
an autonomous vehicle, comprising:
a communications system configured to communicate with a base station;
a control system communicatively coupled to the communications system, the control system comprising a processor configured to:
receive driving commands from the base station;
execute the driving commands to drive the autonomous vehicle;
execute a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle; and
execute a base station-to-vehicle latency protocol to determine a second communications latency between the autonomous vehicle and the base station, and to stop the autonomous vehicle if the second communications latency exceeds a user-configurable second latency value, wherein the base station is disposed external to the autonomous vehicle.

2. The system of claim 1, wherein the processor is configured to execute the vehicle controller-to-subsystems latency protocol by executing a heartbeat process deriving a time of receipt of messages between the vehicle controller and the vehicle subsystems.

3. The system of claim 1, wherein the processor is configured to execute the base station-to-vehicle latency protocol by executing a second heartbeat process timing a receipt of messages between the communications system and the base station.

4. The system of claim 1, wherein the autonomous vehicle comprises a CAN bus communicatively coupling the vehicle controller and the vehicle subsystems.

5. The system of claim 4, wherein the vehicle subsystems comprise a steering system, a throttle system, a transmission system, or a combination thereof.

6. The system of claim 1, wherein the processor is configured to execute an operator exit protocol after an operator exits the vehicle to stop operations of the autonomous vehicle.

7. The system of claim 6, wherein the processor is configured to execute the operator exit protocol via a timing process, via an operator sensing process, or a combination thereof.

8. The system of claim 1, wherein the autonomous vehicle comprises a spatial location system configured to derive a geographic location of the autonomous vehicle, wherein the processor is configured to execute a geographic communications protocol configured to stop the autonomous vehicle if the autonomous vehicle is outside of a geographic area or if the geographic location experiences hopping.

9. A method, comprising:
communicating driving commands from a base station;
executing the driving commands to drive an autonomous vehicle;
executing a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle; and executing a base station-to-vehicle latency protocol to determine a second communications latency between the autonomous vehicle and the base station, and to stop the autonomous vehicle if the second communications latency exceeds a user-configurable second latency value, wherein the base station is disposed external to the autonomous vehicle.

10. The method of claim 9, wherein the executing the base station-to-vehicle latency protocol comprises using a base station processor to execute the base station-to-vehicle latency protocol, using a vehicle processor to execute the base station-to-vehicle latency protocol, or a combination thereof.

11. The method of claim 9, wherein executing the vehicle controller-to-subsystems latency protocol comprises executing a heartbeat process deriving a time of receipt of messages between the vehicle controller and the vehicle subsystems.

12. The method of claim 9, comprising executing an operator exit protocol, via an autonomous vehicle processor, after an operator exits the vehicle to stop operations of the autonomous vehicle.

13. The method of claim 9, comprising deriving, via a spatial location system disposed in the autonomous vehicle, a geographic location of the autonomous vehicle, and executing a geographic communications protocol configured to stop the autonomous vehicle if the autonomous vehicle is outside of a geographic area or if the geographic location experiences hopping.

14. A non-transitory, computer readable medium comprising instructions that when executed by a processor cause the processor to:

receive driving commands from a base station;

execute the driving commands to drive an autonomous vehicle;

execute a vehicle controller-to-subsystems latency protocol to determine a communications latency between a vehicle controller and vehicle subsystems, and to stop the autonomous vehicle if the communications latency exceeds a user-configurable latency value, wherein the vehicle controller and vehicle subsystem are disposed in the autonomous vehicle; and execute a base station-to-vehicle latency protocol to determine a second communications latency between the autonomous vehicle and the base station, and to stop the autonomous vehicle if the second communications latency exceeds a user-configurable second latency value, wherein the base station is disposed in a location external to the autonomous vehicle.

15. The non-transitory, computer readable medium of claim 14, comprising instructions that when executed by the processor, cause the processor to derive, via a spatial location system disposed in the autonomous vehicle, a geographic location of the autonomous vehicle, and execute a geographic communications protocol configured to stop the autonomous vehicle if the autonomous vehicle is outside of a geographic area or if the geographic location experiences hopping.

16. The non-transitory, computer readable medium of claim 14, comprising instructions that when executed by the processor, cause the processor to execute an operator exit protocol, via an autonomous vehicle processor, after an operator exits the vehicle to stop operations of the autonomous vehicle.

17. The non-transitory, computer readable medium of claim 16, comprising instructions that when executed by the processor, cause the processor to execute the operator exit protocol via a timing process, via an operator sensing process, or a combination thereof.

* * * * *